United States Patent
Herfurth et al.

(10) Patent No.: US 9,590,507 B1
(45) Date of Patent: Mar. 7, 2017

(54) AUXILIARY SUPPLY FOR A SWITCHED-MODE POWER SUPPLY CONTROLLER USING BANG-BANG REGULATION

(71) Applicant: Infineon Technologies Austria AG, Villach (AT)

(72) Inventors: Michael Herfurth, Gilching (DE); Rolf Weis, Dresden (DE); Wolfgang Granig, Seeboden (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/974,668

(22) Filed: Dec. 18, 2015

(51) Int. Cl.
    *H02M 3/158* (2006.01)
(52) U.S. Cl.
    CPC .................................. *H02M 3/158* (2013.01)
(58) Field of Classification Search
    CPC .......................... H02M 3/158; H02M 3/3353
    See application file for complete search history.

(56) References Cited

U.S. PATENT DOCUMENTS

| | | | |
|---|---|---|---|
| 5,282,107 A * | 1/1994 | Balakrishnan | H03K 17/0822 323/274 |
| 5,285,369 A | 2/1994 | Balakrishnan | |
| 8,017,996 B2 | 9/2011 | Kaneko | |
| 8,310,281 B2 | 11/2012 | Draxelmayr | |
| 8,411,471 B2 | 4/2013 | Willmeroth et al. | |
| 2006/0097770 A1 | 5/2006 | Disney | |
| 2006/0268584 A1 | 11/2006 | Disney | |
| 2014/0062544 A1 | 3/2014 | Weis et al. | |
| 2014/0062585 A1 | 3/2014 | Weis | |
| 2015/0062544 A1 | 3/2015 | Ershov | |

FOREIGN PATENT DOCUMENTS

DE           19620034 C2     4/1998

OTHER PUBLICATIONS

"AC/DC Buck Controller with PFC for LED Lamps", ICL8201, Infineon Data Sheet, Revision V2.0 May 25, 2015, pp. 1-40.

\* cited by examiner

*Primary Examiner* — Emily P Pham
(74) *Attorney, Agent, or Firm* — Murphy, Bilak & Homiller, PLLC

(57) ABSTRACT

A method in a switched-mode power supply (SMPS) and SMPS circuits are provided. The method and circuits use bang-bang regulation to provide for an auxiliary power supply that can be used to power a controller of the SMPS. The additional circuitry required to achieve the method and circuits is minimal and represents advantages over techniques that require an additional power supply or require an auxiliary winding in a transformer. The bang-bang regulation controls switch devices within the SMPS such that a normally-on switch device is enabled while a normally-off switch device is disabled for some period of time. During this period, current is supplied to the SMPS controller and an associated energy-storage device.

23 Claims, 7 Drawing Sheets

AUXILIARY SUPPLY FOR A SWITCHED-MODE POWER SUPPLY CONTROLLER USING BANG-BANG REGULATION

TECHNICAL FIELD

The present application relates to methods and circuits for providing power to a controller of a switched-mode power supply (SMPS). The techniques disclosed provide power to the SMPS controller using minimal additional circuitry within or external to the SMPS.

BACKGROUND

Switched-mode power supplies (SMPS) are widely used for supplying power to electronic devices (loads) such as computers, television sets, lighting systems and other electronic appliances. As with other power supplies, an SMPS converts power from a power source into a form more appropriate for a load. In typical applications, the source power is obtained from an alternating current (AC) mains voltage with a frequency of 50 Hz to 60 Hz and root mean square (RMS) voltage levels of 90V to 240V. The SMPS converts this source power into a lower-voltage direct current (DC) power supplied to the load.

SMPS have several advantages over other power supply types. SMPS are often significantly more efficient than other power supply types as they waste less energy in ohmic losses, e.g., as done by power supplies relying on linear regulation. Because wasted energy must typically be dissipated as heat, SMPS have reduced heat dissipation requirements meaning fewer and/or smaller heat sinks are required. Furthermore, some SMPS configurations require no or a smaller transformer than other power supply types. For these reasons, SMPS are often smaller and less expensive than other power supply types.

While there are many configurations for SMPS, all of them switch (enable and disable), at some level, power that is supplied to an output load. An SMPS controller governs this switching by varying parameters such as the frequency and/or duty cycle of a pulse-width-modulated (PWM) signal that is used to drive one or more switch devices, e.g., transistors, such that the output power supplied to a load meets the load's power requirements in terms of voltage and current The SMPS controller is, itself, an electronic device that must be powered. Power must be supplied to the SMPS controller during the start-up of the SMPS and for the continuing (steady-state) operation of the SMPS. Some prior solutions for supplying power to the SMPS controller have relied upon a separate power supply that is external to the SMPS. Other solutions have tapped an auxiliary winding of a transformer within the SMPS to supply power to the SMPS controller. Use of an external power supply has the disadvantage that it requires extra circuitry thereby increasing the size and cost of the SMPS system. Use of the auxiliary winding of a transformer requires that the SMPS include a transformer, which may not be desirable in some SMPS designs, e.g., buck converters without a transformer. Even for SMPS designs that incorporate a transformer, it may be preferred to not require the inclusion of an auxiliary winding (having an associated size and cost) within the transformer.

Circuits and methods for supplying power to an SMPS controller are desired. Such circuits and methods should require minimal circuit components beyond what is required for the SMPS, and should be capable of supplying power to an SMPS controller during start-up and steady-state operation of the SMPS.

SUMMARY

According to an embodiment of a method in a switched-mode power supply (SMPS), power is supplied to a controller of the SMPS using a normally-on switch device that is connected in series with a normally-off switch device at a tap connection point. Current is supplied to a load of the SMPS by enabling both the normally-on and normally-off switch devices such that both are conducting. The normally-off device is disabled and, subsequently, the voltage at the tap connection point is monitored. If the monitored tap connection voltage is detected to be above a first threshold level, the normally-on switch device is enabled or remains enabled. Should the monitored tap connection voltage be detected to exceed a second level that is higher than the first level, then the normally-on switch device is disabled.

According to an embodiment of a switched-mode power supply (SMPS) circuit, the SMPS circuit comprises a normally-on switch device and a normally-off switch device connected in series at a tap connection point. The SMPS circuit further includes an SMPS controller that is supplied power from the tap connection point, and a bang-bang controller. The bang-bang controller is configured to monitor the voltage at the tap connection point and control the normally-on switch device. The bang-bang controller enables, or leaves enabled, the normally-on device responsive to detecting that the tap connection voltage is below a first threshold level. Upon detecting that the tap connection voltage exceeds a second level that is higher than the first level, the bang-bang controller disables the normally-on device.

For the above-described SMPS method and circuit embodiments, the normally-off switch device defaults to a disabled state in which current is not conducted between its input and output terminals. The normally-off switch device is enabled by supplying an appropriate signal to a control terminal of the normally-off device, thereby causing current to be conducted between its input and output terminals. The normally-on switch device defaults to an enabled state in which current is conducted between its input and output terminals. The normally-on switch device is disabled by supplying an appropriate signal to a control terminal of the normally-on switch device, thereby preventing current conduction between its input and output terminals.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide for supplying power to a controller of a switched-mode power supply (SMPS) during a startup period of the SMPS as well as during its steady-state operation. This is accomplished without requiring an external power supply. By appropriately configuring existing circuitry of the SMPS, the embodiments are able to supply power to the SMPS controller using minimal additional circuitry.

Various embodiments will now be described in the following description and the associated figures. These embodiments provide particular examples for purposes of explanation, and are not meant to limit the invention. Features and aspects from the example embodiments may be combined or re-arranged except where the context does not allow this.

The invention is directed to embodiments of an SMPS. SMPS are, generally, well-known in the art. In order to avoid obfuscating the unique aspects of the invention, well-known aspects related to the control of the SMPS, e.g., determining the frequency and duty cycle for the switching, are not discussed in detail. This would include the determination of such parameters for both open-loop SMPS as well as closed-loop supplies wherein a voltage output of the SMPS is used to determine and/or adjust such parameters.

SMPS may be implemented using a variety of topologies such as flyback, forward, buck, boost, buck-boost, etc. The techniques described herein apply similarly to several such topologies, and the specific topology is not particularly important. In order to avoid unnecessary complexity, the example embodiments will be described using a limited set of topologies, with the understanding that the invention may be implemented within other SMPS topologies also.

Figure 1:
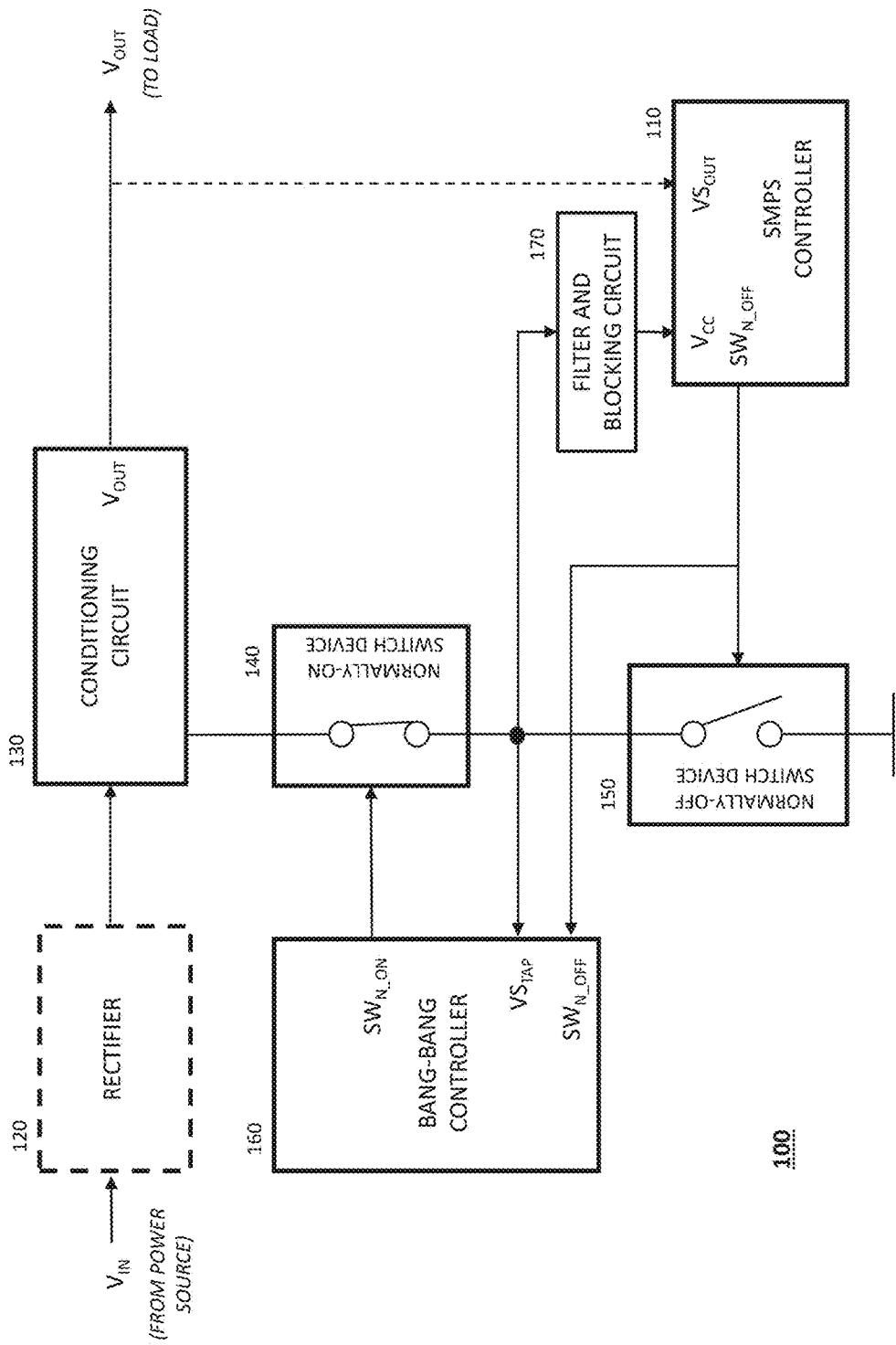
FIG. 1 illustrates a block diagram of a switched-mode power supply (SMPS) that is configured to supply power to a controller of the SMPS.

FIG. 1 illustrates a high-level block diagram of an SMPS 100 that may be used to supply power to a controller 110 of the SMPS. A power source (not shown) provides power, via input $V_{IN}$, to the SMPS at a rectifier 120 or similar. In typical configurations, the power source may be an alternating current (AC) supply provided by a mains voltage with a frequency of 50 to 60 Hz and a voltage level of 90 to 240 $V_{RMS}$. The rectifier 120 converts the AC voltage into a direct-current (DC) voltage that is supplied to a conditioning circuit 130. In some applications, e.g., battery-powered devices, the power source may supply DC voltage in which case the rectifier may be omitted or replaced with some other circuitry, e.g., a DC transformer or similar.

The conditioning circuit 130 will vary depending upon the topology of the SMPS 100. In an isolated topology, the conditioning circuit 130 may include a flyback transformer wherein current through a primary winding is switched in order to provide a desired output voltage and current at a secondary winding of the transformer. The output voltage ($V_{OUT}$) is then provided to some load such as an electronic device (e.g., lighting system, radio, television, appliance). In a non-isolated topology, such as a buck converter, the conditioning circuit 130 typically includes a diode and inductor rather than a flyback transformer. A buck converter is typically smaller and less expensive than an isolated topology based upon a flyback transformer. Henceforth, the SMPS 100 will be described presuming the conditioning circuit 130 includes a flyback transformer, though it should be understood that the SMPS 100 would similarly support other topologies.

Current is switched through the primary winding of a flyback transformer, as included in conditioning circuit 130, using one or more switches such as a normally-on switch device 140 and a normally-off switch device 150. A normally-on switch device is characterized in that it conducts current unless it is provided with a control signal, e.g., at a control terminal of the switch device, that disables the switch. For example, a negative voltage provided at a control terminal of normally-on switch device 140 may disable the device such that it conducts no current between its input and output terminals. Conversely, a zero voltage provided at this control terminal enables the device 140 such that it does conduct current between its input and output terminal. Should no control signal be provided on the control terminal, e.g., the terminal is "floating," the switch device 140 defaults to being enabled and conducting current between its input and output terminals. The normally-on switch device 140 preferably includes a depletion-mode N-channel metal-oxide semiconductor (MOS) field-effect transistor (FET), though other devices such as junction FETs (JFETs), high-electron-mobility transistors (HEMTs), etc. may be used in some applications.

A normally-off switch device is characterized in that it does not conduct current unless it is provided with a control signal, e.g., at a control terminal of the switch device, that enables the switch. For example, a positive voltage provided at a control terminal to the normally-off switch device 150 may enable the device such that it conducts current between its input and output terminals. Conversely, a zero voltage provided at this control terminal disables the device 150 such that it conducts no current between its input and output terminal. Should no control signal be provided on the control terminal, e.g., the terminal is "floating," the switch device 150 defaults to being disabled and conducting no current between its input and output terminals. The normally-off switch device 150 preferably includes an enhancement-mode N-channel metal-oxide semiconductor (MOS) field-effect transistor (FET), though other devices such as JFETs, bipolar junction transistors (BJTs), etc. may be used in some applications.

The SMPS controller 110 controls the switching of current by appropriately controlling switch devices such as normally-on switch device 140 and normally-off switch device 150. The controller 110 typically produces a pulse-width-modulated (PWM) waveform having a frequency and duty cycle configured to produce the required output voltage $V_{OUT}$. In some implementations, the SMPS controller 110 may sense, at an input $VS_{OUT}$, the output voltage $V_{OUT}$ using, e.g., an opto-coupler driven by the output voltage directly, or an auxiliary winding of a flyback transformer within conditioning circuit 130. In such implementations, the PWM waveform may be adjusted to maintain the required output voltage $V_{OUT}$.

In a conventional SMPS using normally-on and/or normally-off switch devices, the SMPS controller switches the SMPS switch devices simultaneously (or nearly so) using the PWM waveform and/or variants of the PWM waveform (e.g., an inverted version). The SMPS of the present invention varies from such conventional approaches in that the switch devices are not switched simultaneously. More particularly, the switches are controlled such that there is some period of time during which the normally-on switch device 140 is enabled (conducting), while the normally-off switch 150 is disabled (not conducting). During such a period of time, current flowing through the normally-on switch device 140 is provided to a power supply input ($V_{CC}$) of the SMPS controller 110 via a filter and blocking circuit 170. The filter and blocking circuit 170 includes an energy storage device (such as a capacitor) as well as components to prevent a direct short between the normally-off switch device 150 and the input power supply ($V_{CC}$) of the SMPS controller 110. The SMPS controller 110 is able to be powered thusly.

The normally-off switch device 150 is controlled by the SMPS controller using a PWM waveform output $SW_{N\_OFF}$. The normally-on switch device 140 is controlled by a bang-bang controller 160 from its output $SW_{N\_ON}$. The bang-bang controller 160 may be provided with the signal $SW_{N\_OFF}$ from the SMPS controller 110 so that the bang-bang controller 160 can synchronize the enabling and disabling of the normally-on switch device 140 with the switching of the normally-off switch device 150.

A voltage at the tap connection point between the normally-on and normally-off switch devices is sensed by the bang-bang controller 160 at an input $VS_{TAP}$. During periods when the normally-off switch device 150 is disabled, the bang-bang controller enables (or leaves enabled) the normally-on switch device 140 responsive to detecting that the voltage at the tap connection point is below a first level. The bang-bang controller 160 disables the normally-on device 140 responsive to detecting that the voltage at the tap connection point is above a second level that is higher than the first level. If the voltage at the tap connection point is between the first and second thresholds, no changes are made to the state of the normally-on switch 140.

The bang-bang controller 160 may be implemented using discrete hardware components such as transistors, diodes, and resistors, may be implemented using processor circuitry including digital and analog components, or may be implemented using a combination of such hardware components and processor circuitry. The bang-bang controller 160 may be a separate controller, as shown in FIG. 1, or it may be integrated within the SMPS controller 110.

Figure 2:
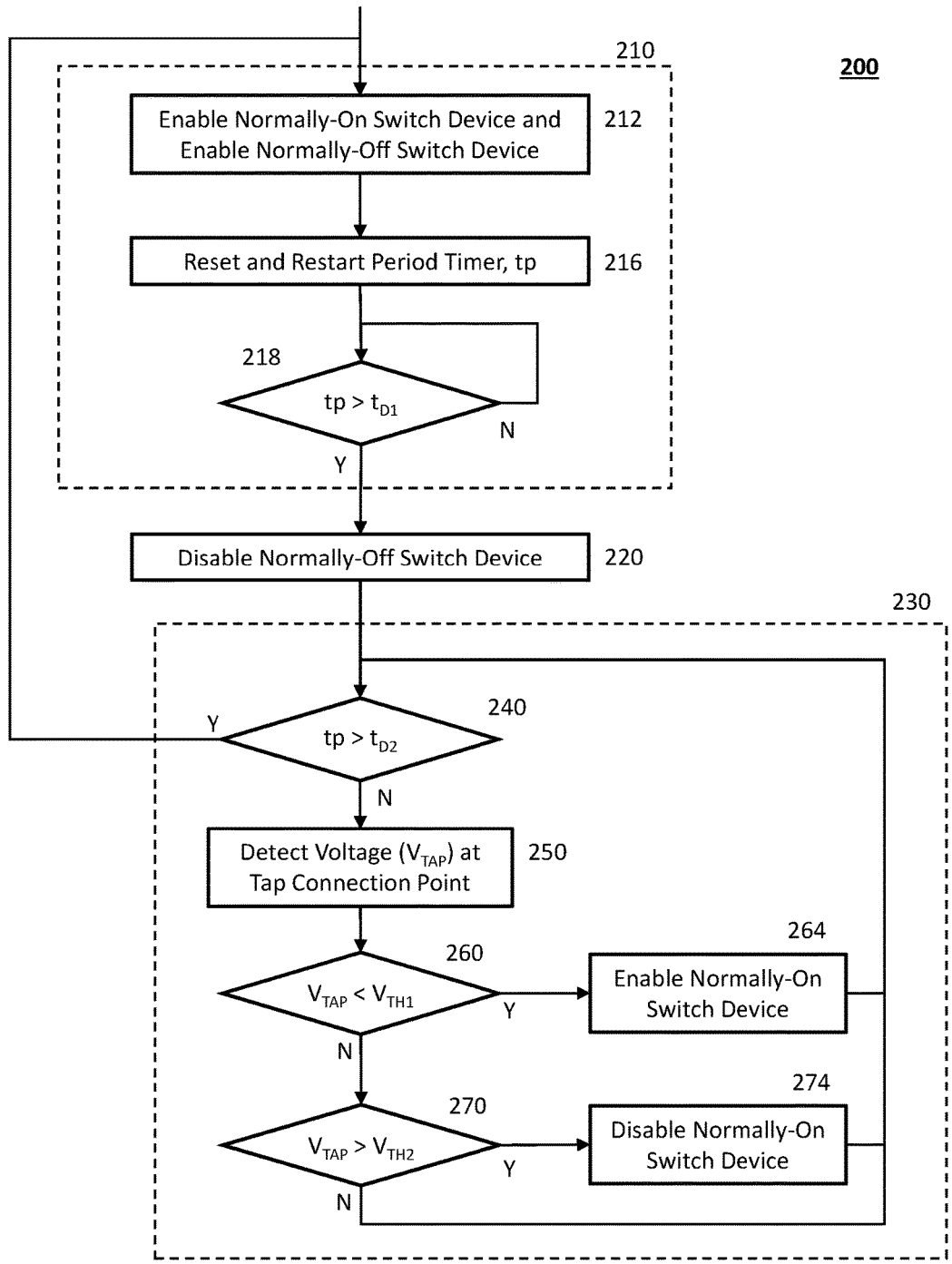
FIG. 2 illustrates a method for supplying power to an SMPS controller.

FIG. 2 illustrates an embodiment of a method that is directed to supplying power to an SMPS controller. This method could be implemented in an SMPS such as that illustrated in FIG. 1.

The method 200 begins by enabling normally-on and normally-off switch devices 212. A timer $t_p$, as might be included in SMPS controller 110, is reset 216 and used to keep both switch devices enabled for a time period $t_{D1}$, wherein the time period might be determined by SMPS controller 110 using conventional techniques. Once the switch devices have been enabled for this time period, as indicated by the timer $t_p$ reaching $t_{D1}$ 218, the normally-off device is disabled 220. The operational phase during which both switch devices are enabled is denoted in FIG. 2 by the dotted box 210.

After the normally-on switch device is disabled 220, a second operational phase 230 is performed until time $t_{D2}$. During this phase, the voltage at the tap connection point is monitored 250. If the detected tap voltage falls below a first threshold $V_{TH1}$ 260, the normally-on switch device is enabled or, if already enabled, remains enabled 264. If the detected tap voltage rises above a second threshold $V_{TH2}$ 270 that is higher than the first threshold, the normally-on switch device is disabled 274. If the detected tap voltage is between the first and second thresholds, no changes are made to the state of the normally-on switch device. This process is repeated until the end of the time period $t_{D2}$ is reached 240, as indicated by the timer $t_p$, at which point the method starts over by enabling both switches 212.

The use of both the lower threshold $V_{TH1}$ and the upper threshold $V_{TH2}$ in controlling the normally-on switch device provides hysteresis in the switching of the device and, thereby, prevents excessive switching that may lead to undesirable power usage (and noise) in the switching of the normally-on device as well as its controller, e.g., the bang-bang controller 160.

In an embodiment (not shown) comprising a slightly altered version of the above-described method, a third voltage threshold $V_{TH3}$ is defined. This threshold is higher than both the first threshold $V_{TH1}$ and the second threshold $V_{TH2}$. Should the voltage at the tap connection point ($V_{TAP}$) be detected as reaching the third threshold $V_{TH3}$, a clamping device is enabled to prevent the voltage $V_{TAP}$ from increasing above $V_{TH3}$. The clamping device may be, e.g., an avalanche diode with a breakdown voltage equal to the third threshold $V_{TH3}$.

Figure 3:
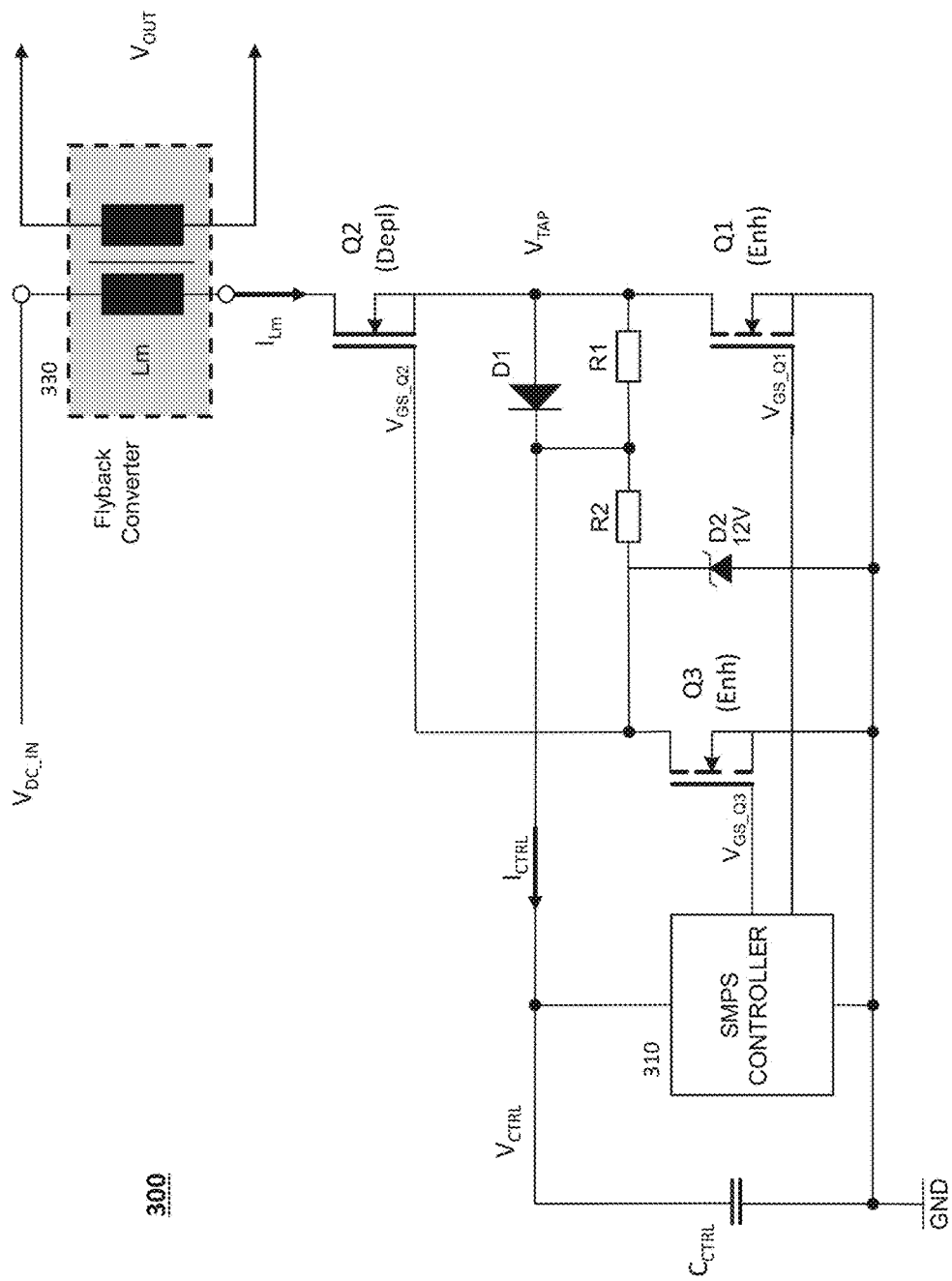
FIG. 3 illustrates an SMPS circuit, including a flyback converter, configured to supply power to a controller of the SMPS.

FIG. 3 illustrates an embodiment of an SMPS circuit 300 that could be used to supply power to a controller 310 of the SMPS. The method described above in conjunction with FIG. 2 could be performed by such a circuit.

An external source (not shown) provides power at an input $V_{DC\_IN}$. This power source may be provided, e.g., by a rectifier connected to an AC mains voltage or by a DC supply. $V_{DC\_IN}$ is input to a flyback converter 330 having a primary winding, denoted by Lm, and a secondary winding configured to supply an output voltage ($V_{OUT}$) to a load of the SMPS. A current, denoted as $I_{Lm}$, flowing through the primary winding Lm is switched in order to provide an output voltage ($V_{OUT}$) and current meeting the requirements of the load. The current $I_{Lm}$ is switched using depletion-mode MOSFET Q2 (normally on) and enhancement-mode MOSFET Q1 (normally off), wherein MOSFET Q2 is further controlled using enhancement-mode MOSFET Q3 (normally off).

The MOSFETs Q1, Q2, and Q3 are each controlled using a voltage applied to their respective gate terminals. MOSFET Q2 is an N-channel depletion-mode device. When a negative voltage of sufficient magnitude, commonly termed the threshold voltage for the device, is applied across the gate-to-source terminals, the device is disabled such that current conduction is suppressed between its drain and source terminals. When the gate-to-source voltage, denoted $V_{GS\_Q2}$, is zero or is left floating, the device Q2 is enabled so that current does conduct between its drain and source terminals. MOSFETs Q1 and Q3 are N-channel enhancement-mode devices. When a positive voltage of sufficient magnitude is applied across the gate-to-source terminals of such a MOSFET, e.g., $V_{GS\_Q1}$ or $V_{GS\_Q2}$ is above a threshold voltage for the respective device, the enhancement-mode MOSFET is enabled and conducts current. Otherwise, the enhancement-mode MOSFET is disabled such that it does not conduct current.

SMPS controller 310 is similar to the SMPS controller 110 shown in FIG. 1. The bang-bang controller 160 of FIG. 1 is effectively implemented by the SMPS controller 310 and other circuitry within FIG. 3, e.g., MOSFET Q3.

Figure 4:
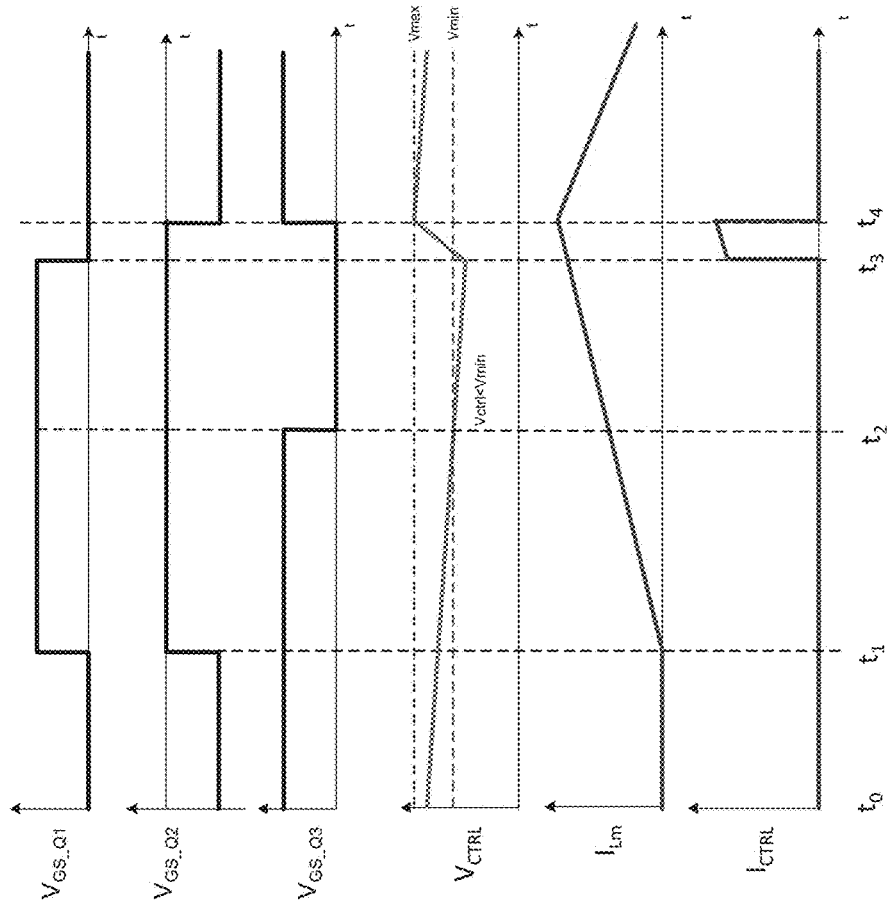
FIG. 4 illustrates waveforms produced by an SMPS circuit configured to supply power to a controller of the SMPS.

The functionality of the SMPS circuit 300 will now be described in conjunction with the waveforms illustrated in FIG. 4. At time $t_1$, the SMPS controller 310 enables MOSFET Q1 by applying a positive voltage to its gate, i.e., at $V_{GS\_Q1}$. With MOSFET Q3 already enabled, little current will flow through resistors R1 and R2. (Resistors R1 and R2 have relatively high resistances with R2>>R1. For example, R1=10 kΩ and R2=50 kΩ) Hence, the voltage at the gate of MOSFET Q2 will be approximately the same as the voltage at the tap connection point between MOSFET Q2 and MOSFET Q1. With $V_{GS\_Q2}$ approximately zero, depletion-mode MOSFET Q2 is enabled. With MOSFETS Q1 and Q2 enabled, current $I_{Lm}$ flows from $V_{DC\_IN}$ through the MOSFETs to ground, and the flyback converter 330 is energized. As shown in the $I_{Lm}$ waveform of FIG. 4, the current $I_{Lm}$ increases gradually over the time period from $t_1$ to $t_4$. The rate of the current increase is determined by the inductance of Lm (the primary winding of flyback converter 330).

At time $t_2$, SMPS controller 310 detects that its supply voltage, $V_{CTRL}$, has dropped below a first voltage threshold $V_{min}$ and, in response, disables MOSFET Q3 by driving a low voltage onto $V_{GS\_Q3}$. At time $t_3$, SMPS controller 310 disables MOSFET Q1 but, with MOSFET Q3 disabled, MOSFET Q2 remains enabled. (No negative bias voltage is applied at $V_{GS\_Q2}$.) With MOSFET Q2 enabled and MOSFET Q1 disabled, the current $I_{Lm}$ through inductor Lm is directed through diode D1. This current, denoted $I_{CTRL}$, provides power to the SMPS controller 310 and charges the capacitor $C_{CTRL}$. As shown in the waveforms of FIG. 4, current $I_{CTRL}$ flows during the period between time $t_3$ and t. As the capacitor $C_{CTRL}$ is charged, the SMPS power supply voltage $V_{CTRL}$ grows until it reaches a second threshold denoted as $V_{max}$.

Upon detecting that the supply voltage $V_{CTRL}$ has reached the second threshold $V_{max}$, SMPS controller 310 disables MOSFET Q2 by enabling MOSFET Q3 by driving its gate voltage $V_{GS\_Q3}$ high. (With MOSFET Q3 enabled, some of the current flowing through MOSFET Q2 and diode D1 will flow through resistor R2. This creates a voltage drop across R2 leading to a negative gate-to-source voltage $V_{GS\_Q2}$ which, in turn, disables MOSFET Q2.) The SMPS controller 310 then draws its current (power) from the capacitor $C_{CTRL}$ and the voltage $V_{CTRL}$ gradually decreases until the next time period during which MOSFET Q2 is enabled and MOSFET Q1 is disabled.

Avalanche diode D2 is connected to the drain of MOSFET Q3 (equivalently, the gate of MOSFET Q2) and serves to limit the voltage ($V_{TAP}$) at the tap connection point and, related, the SMPS controller voltage $V_{CTRL}$. For an avalanche diode D2 with a reverse-bias breakdown of 12V, the voltage at the gate of MOSFET Q2 will be clamped at 12V. With a typical voltage threshold of 2V for MOSFET Q2, the tap connection voltage $V_{TAP}$ will effectively be clamped at 14V. The voltage $V_{CTRL}$ is connected to $V_{TAP}$ via R1 and, as a result, $V_{CTRL}$ will also be limited to 14V in this example. Diode D2 serves to limit these voltages during a startup phase before the SMPS controller is functioning, and serves as a safety limit should the SMPS controller malfunction such that it fails to limit the $V_{TAP}$ voltage to the second threshold.

Figure 5:
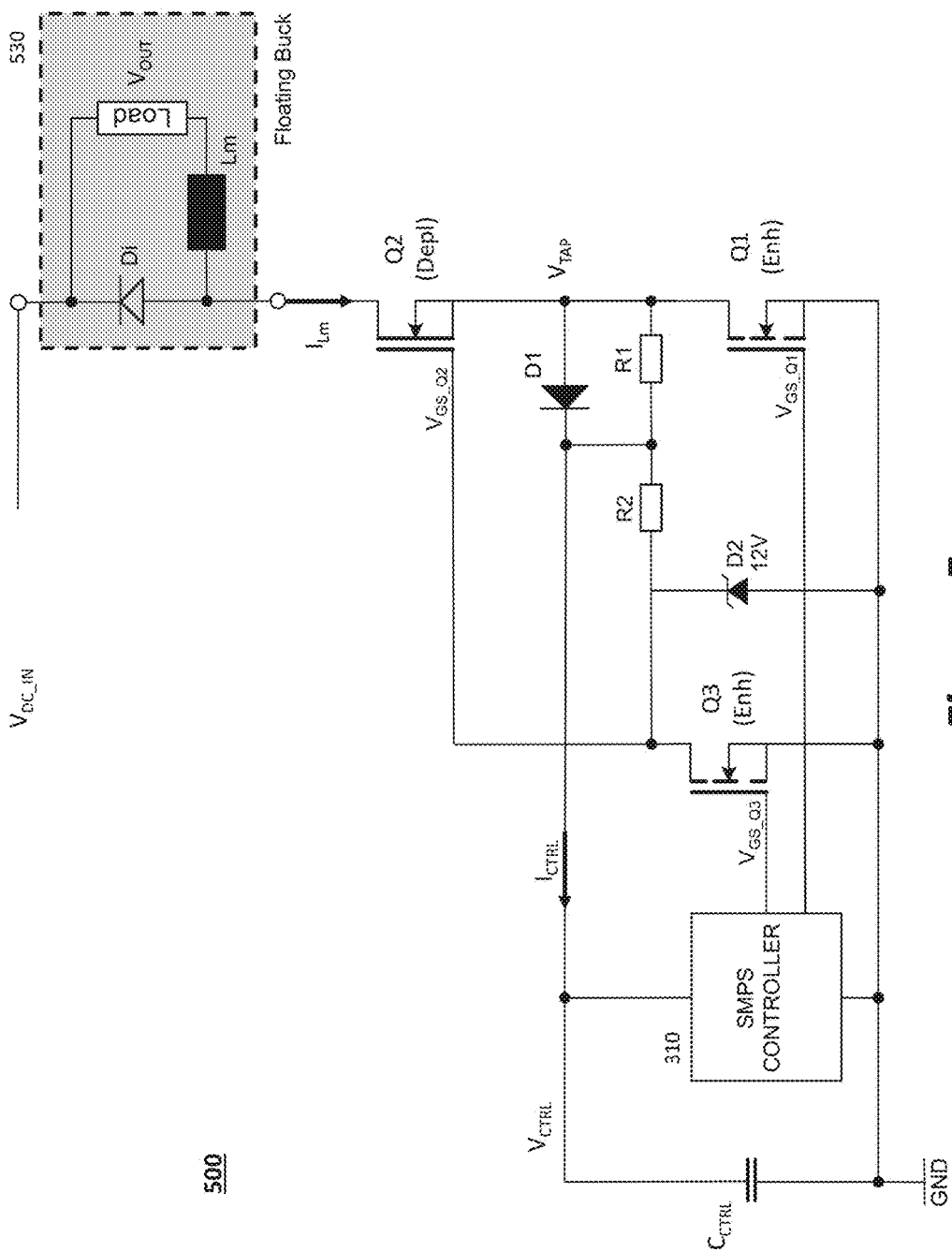
FIG. 5 illustrates a variant of the SMPS circuit of FIG. 3 in which the flyback converter is removed and the SMPS is configured in a floating buck topology.

FIG. 5 illustrates an alternative embodiment of an SMPS circuit 500 that could be used to supply power to a controller 310 of the SMPS. In this embodiment, the flyback converter (transformer) of FIG. 3 has been replaced with circuitry 530 to implement a floating buck converter. A floating buck converter has cost and size advantages over a flyback converter (or most other isolated topologies), as a floating buck converter requires no transformer. The functionality, particularly as it relates to the switching of the MOSFETS, for this alternative embodiment is largely the same as that of the embodiment of FIG. 3 and, thus, will not be explained in further detail. Note that topologies other than the flyback converter and floating buck converter, e.g., boost converter, buck-boost converter, forward, half-forward, may also be supported by circuits similar to those of FIGS. 3 and 5.

Figure 6:
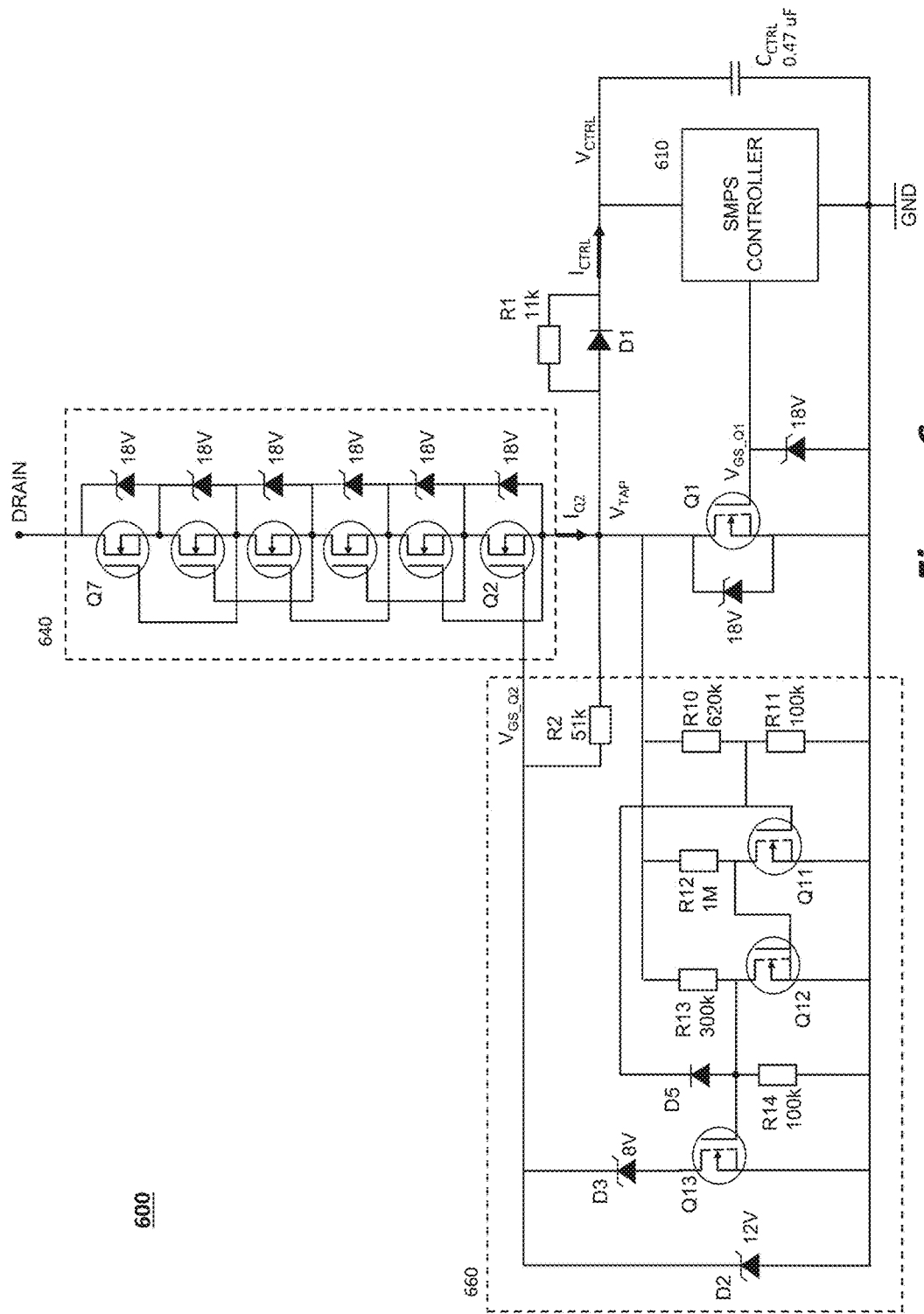
FIG. 6 illustrates an SMPS circuit configured to power a controller of the SMPS in which a cascade of normally-on switch devices is used to power the load of the SMPS, and in which a bang-bang controller is implemented separately from the SMPS controller.

FIG. 6 illustrates yet another embodiment of an SMPS circuit 600 that could be used to supply power to a controller 610 of the SMPS. This circuit differs from those of FIGS. 3 and 5 in two significant ways. First, the depletion-mode MOSFET Q2 of the prior circuits is replaced with a plurality of depletion-mode MOSFETs Q2 to Q7 cascaded together 640. Note that this chain of MOSFETs 640 is enabled and disabled by the gate terminal of Q2, in much the same manner as the prior circuit embodiments. Second, a bang-bang controller 660 is implemented using hardware circuitry separate from the SMPS controller 610. SMPS controller 610 still controls the enhancement-mode MOSFET Q1, but the hysteretic control of depletion-mode MOSFET Q2 is implemented using the bang-bang controller 660. The operation of the SMPS circuit 600 will now be explained with a particular emphasis on the operation of the bang-bang controller 660.

During a startup phase of the SMPS circuit 600, the SMPS controller 610 is not yet operational as its supply voltage $V_{CTRL}$ has not reached an adequate level. During this phase, the gates of MOSFETS Q1 and Q2 are not driven and, hence, enhancement-mode MOSFET Q1 defaults to its disabled state whereas depletion-mode MOSFET Q2 defaults to its enabled state. Current is supplied from some external source (not shown) to the DRAIN of MOSFET Q7 and flows to the source of MOSFET Q2. (The external source could be, e.g., a flyback converter 330 as shown in FIG. 3 or floating buck circuitry 530 as shown in FIG. 5.)

With MOSFET Q1 disabled, the current ($I_{Q2}$) from the source of MOSFET Q2, flows primarily through diode D1 and charges capacitor $C_{CTRL}$. As the voltage ($V_{CTRL}$) across $C_{CTRL}$ increases, the voltage at the tap connection point ($V_{TAP}$) will also increase. A 12V avalanche diode D2 connected to the gate of MOSFET Q2 and to resistor R2 serves to prevent the voltages $V_{TAP}$ and $V_{CTRL}$ from rising to levels that might damage circuitry such as the SMPS controller 610. Specifically, diode D2 limits the voltage at the gate of MOSFET Q2 ($V_{GS\_Q2}$) from rising above 12V. Assuming that the gate threshold voltage for MOSFET Q2 is 2V, the voltage at the tap connection point ($V_{TAP}$) is thus prevented from rising above 14V. Once the power supply voltage $V_{CTRL}$ reaches an adequate "turn-on" level for the SMPS controller 610, the SMPS controller 610 will begin operating.

MOSFET Q2 may be disabled by enhancement-mode MOSFET Q13 (via diode D3) of the bang-bang controller 660. When MOSFET Q13 is enabled, current is drawn through resistor R2 creating a negative voltage (e.g., −2V) between the gate and source of MOSFET Q2 ($V_{GS\_Q2}$), thereby disabling MOSFET Q2. During the startup phase of the SMPS circuit 600, the tap connection voltage ($V_{TAP}$) is too low to enable MOSFET Q13, and, hence, MOSFET Q2 is kept enabled. (The operation of MOSFET Q13 will be explained below in more detail as part of the steady-state operation of the SMPS circuit 600.)

During a steady-state phase of the SMPS circuit 600, the SMPS controller 610 ensures an adequate voltage and current output to a load (not shown) of the SMPS circuit 600 by appropriately switching MOSFET Q1, e.g., by applying a pulse-width-modulated (PWM) voltage to a gate terminal of MOSFET Q1 ($V_{GS\_Q1}$). With MOSFET Q1 enabled, current flowing into the tap connection point (from the depletion-mode MOSFETs Q2 to Q7) will primarily flow through MOSFET Q1 rather than into diode D1, resistor R1, or any of resistors R2, R10, R12 or R13, because the MOSFET Q1 offers the lowest impedance path to ground. With little or no current flow across resistor R2, the gate-to-source voltage of MOSFET Q2 ($V_{GS\_Q2}$) is kept near zero meaning that MOSFET Q2 is held in its default state of being enabled. In summary, whenever enhancement-mode MOSFET Q1 is enabled, depletion-mode MOSFET Q2 will be kept enabled in the SMPS circuit 600.

The tap connection voltage ($V_{TAP}$) will be relatively low during this period due to the low impedance of MOSFET Q1 in its enabled state. The diode D1 blocks current from flowing from the $V_{CTRL}$ node (which varies from about 9V to 13V) to the $V_{TAP}$ node during this period, but there will be some leakage through resistor R1.

Once the SMPS controller 610 disables MOSFET Q1 (e.g., by applying a low voltage at $V_{GS\_Q1}$), the bang-bang controller 660 controls MOSFET Q2 such that the MOSFET Q2 is enabled (or remains enabled) if the voltage at the tap connection point ($V_{TAP}$) is below a first threshold voltage (e.g., 10V). Once the voltage at the tap connection point ($V_{TAP}$) rises above a second threshold voltage (e.g., 13.5V) that is higher than the first threshold voltage, the bang-bang controller disables MOSFET Q2. If the voltage at the tap connection point ($V_{TAP}$) is between the first and second thresholds, no changes are made to the state of MOSFET Q2.

During the period of time when MOSFET Q2 is enabled and MOSFET Q1 is disabled, current, denoted $I_{CTRL}$ in FIG. 6, is supplied, via diode D1, to the SMPS controller 610 and capacitor $C_{CTRL}$. This current charges capacitor $C_{CTRL}$ provided that the voltage across $C_{CTRL}$ ($V_{CTRL}$) is sufficiently low (e.g., below about 13V). This is because diode D1 presents the lowest impedance to the current flow from the source of MOSFET Q1 ($I_{Q2}$). As the capacitor $C_{CTRL}$ charges, its voltage ($V_{CTRL}$) gradually builds. Once this voltage reaches a high enough level (e.g., approaching the second threshold voltage level at $V_{TAP}$ of 13.5V), the diode D1 is disabled as the tap voltage $V_{TAP}$ is close enough the capacitor voltage $V_{CTRL}$ that the voltage drop across the diode D1 is below the diode's forward voltage threshold (e.g., 0.6V). With diode D1 effectively disabled, the voltage nodes $V_{TAP}$ and $V_{CTRL}$ are still connected together via resistor R1.

The operation of the bang-bang controller 660 will now be explained for the period of time starting after MOSFET Q1 is disabled. The MOSFETS Q11, Q12, and Q13 are enhancement-mode devices having threshold voltages of, e.g., about 2V. For moderately low voltages (e.g., between about 2V and 12V) at $V_{TAP}$, MOSFET Q11 is disabled, MOSFET Q12 is enabled, and MOSFET Q13 is disabled. Consider MOSFET Q11 first. The voltage divider comprised of R11 and R10, in conjunction with a voltage at $V_{TAP}$ in a moderate range, is inadequate to enable MOSFET Q11 as its gate voltage will remain below its threshold voltage (e.g., 2V). With MOSFET Q11 disabled, the gate of MOSFET Q12 is pulled high via resistor R12 and the voltage at $V_{TAP}$, i.e., the gate of MOSFET Q12 is above its threshold voltage (e.g., 2V). With MOSFET Q12 enabled, MOSFET Q12 presents a lower impedance to ground than resistor R14. Hence, the gate of MOSFET Q13 is held at a voltage below its threshold voltage (e.g., 2V). Therefore, MOSFET Q13 is disabled and does not drive a gate voltage for Q2 ($V_{GS\_Q2}$). The gate voltage for MOSFET Q2 ($V_{GS\_Q2}$) thus remains at the source voltage level ($V_{TAP}$) so that MOSFET Q2 maintains its enabled state.

The operation will further be explained as the voltage $V_{TAP}$ approaches the second threshold voltage (e.g., 13.5V). As explained previously, once MOSFET Q1 is disabled, the voltage at the tap connection point ($V_{TAP}$) is no longer held low by MOSFET Q1 and this voltage can be pulled to a higher level. As the voltage $V_{TAP}$ increases (in conjunction with the voltage $V_{CTRL}$), the voltage at the gate of MOSFET Q11 increases until MOSFET Q11 is enabled. Provided diode D5 is not conducting, the voltage at the gate of MOSFET Q11 ($V_{GS\_Q11}$) is determined by the voltage divider comprised of R11 and R10 as follows:

$$V_{GS\_Q11} = V_{TAP} * (R11/(R10+R11)) \quad (1)$$

For example, as $V_{TAP}$ approaches 13.5V and with R11=100 kΩ and R10=620 kΩ, the gate voltage for MOSFET Q11 approaches:

$$V_{GS\_Q11} = (13.5V)*(100\ k\Omega/(100\ k\Omega+620\ k\Omega)) \approx 1.9V \quad (2)$$

This gate voltage, while not quite at the 2V nominal threshold voltage for MOSFET Q11, is adequate to largely enable MOSFET Q11 such that it will conduct current between its drain and source. The drain of MOSFET Q11, which connects to the gate of MOSFET Q12, is thus pulled to a low voltage level such that MOSFET Q12 is disabled. With MOSFET Q12 disabled, the gate of Q13 is now largely controlled by the voltage divider comprising resistors R14 and R13. With $V_{TAP}$ approaching 13.5V, and R13=300 kΩ and R14=100 kΩ, the gate voltage for MOSFET Q13 is given approximately by:

$$V_{GS\_Q13} = V_{TAP} * (R14/(R13+R14)) \quad (3)$$

$$=(13.5V)*(100\ k\Omega/(100\ k\Omega+300\ k\Omega)) \approx 3.4V. \quad (4)$$

This is well above voltage threshold for MOSFET Q13 and, hence, MOSFET Q13 is enabled.

Note that the voltage at the gate of MOSFET Q13 is considerably higher than the voltage at the gate of MOSFET Q11 after MOSFET Q12 has been disabled. For the given example, the voltage at the gate of MOSFET Q13 is 3.4V, whereas the voltage at the gate of MOSFET Q11 was 1.9V immediately prior to the disabling of MOSFET Q12. Because this voltage difference is higher than the threshold voltage (e.g., 0.6V) for diode D5, diode D5 will be forward biased and conduct current. As long as diode D5 is forward biased, the voltage difference between the gates of MOSFETs Q11 and Q13 will be fixed approximately to the threshold voltage of diode D5. This will tend to pull the gate voltage for MOSFET Q11 higher, as long as diode D5 is forward biased. Diode D5 serves to lock-in the current state of bang-bang controller such that it maintains MOSFET Q2 in its disabled state until the tap voltage $V_{TAP}$ falls below a first voltage threshold that is lower than the second voltage threshold (e.g., 13.5V) described above.

Assume, for the sake of simplification, that the voltage divider given by R14 and R13 is unaffected by the other circuit components (e.g, diode D5, R11, R10). As the tap voltage $V_{TAP}$ decreases below the first threshold (e.g., 13.5V) discussed earlier, the voltage divider including R14 and R13 will hold MOSFET Q13 enabled. With diode D5 forward biased, the voltage at the gate of MOSFET Q11 will follow the voltage at the gate of MOSFET Q13, but at a level that is lower by the threshold voltage of diode D5 (e.g., 0.6V). Once $V_{TAP}$ falls to, e.g., 10V, the gate voltage for MOSFET Q13 will be 2.5V [(10V)*(100 kD/(100 kΩ+300 kΩ))] and the voltage at the gate of MOSFET Q11 will be 1.9V (2.5V-0.6V), which is approximately the threshold voltage for MOSFET Q11. Hence, MOSFET Q11 will remain enabled as long as the voltage $V_{TAP}$ remains above the first threshold, e.g., 10V. Once the voltage $V_{TAP}$ falls below 10V, MOSFET Q11 will be disabled, MOSFET Q12 will be enabled, diode D5 will no longer be forward biased, and MOSFET Q13 will be disabled. The gate of MOSFET Q2 will float back to a zero voltage, and the depletion MOSFETs Q2 to Q7 will be enabled. Current will again flow through MOSFET Q2 and diode D1 in order to charge $C_{CTRL}$ and power the SMPS controller 610.

As shown in FIG. 6, the voltage divider comprising R10 and R11 serves as a voltage detector that triggers the enabling of MOSFET Q11. This resistor network could be replaced or supplemented with other components (not shown) including, notably, one or more diodes (e.g., Zener diodes) having appropriate biasing voltages. An implementation using diode(s) to trigger MOSFET Q11 may provide a more accurate voltage detection level (e.g., the first threshold level of 10V at $V_{TAP}$ mentioned previously) than an implementation relying only on a resistor network. Similarly, the resistor network comprising R13 and R14 could be modified to make use of one or more diodes and, thereby, provide a more accurate higher voltage detection level (e.g., the second threshold of 13.5V at $V_{TAP}$ mentioned previously.)

As explained above, the bang-bang controller 660 serves to enable depletion-mode MOSFET Q2 when the tap connection voltage $V_{TAP}$ falls below a first threshold, and to disable depletion-mode MOSFET Q2 when $V_{TAP}$ rises above a second threshold that is higher than the first threshold. The bang-bang controller also limits the voltage level of $V_{TAP}$ to remain below a third level, wherein the third level is higher than the first and second levels. This third level is determined by the breakdown voltage of diode D2 and the threshold voltage of MOSFET Q2. Under the control of bang-bang controller 660, the depletion chain 640 of MOSFETs Q2 to Q7 is able to supply power to the SMPS controller 610 and its energy storage device $C_{CTRL}$.

Figure 7:
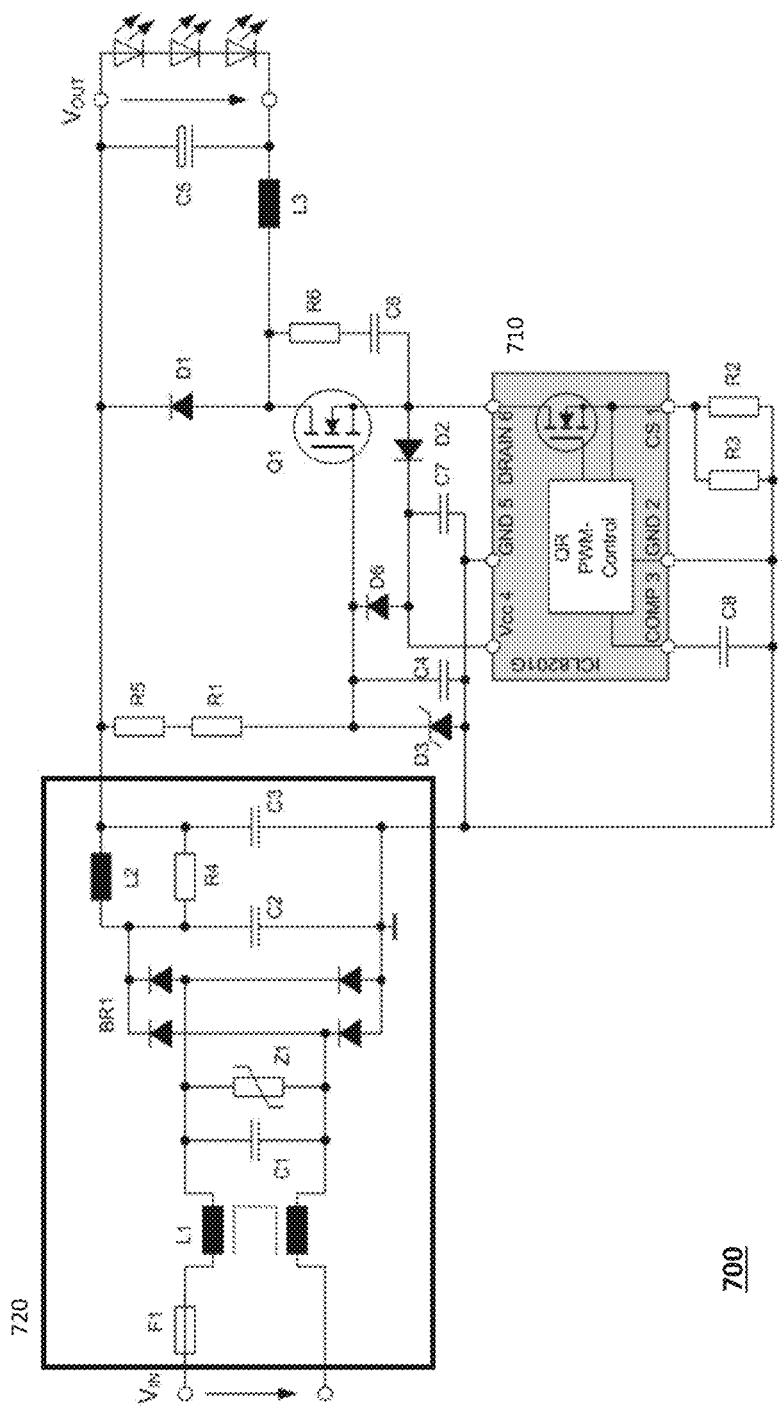
FIG. 7 illustrates an SMPS circuit in which an enhancement-mode metal-oxide semiconductor field-effect transistor is configured to operate as a normally-on switch device, and is configured to supply power to a controller of the SMPS.

FIG. 7 illustrates yet another embodiment of an SMPS circuit 700 that could be used to supply power to a controller 710 of the SMPS. In view of the detailed description provided above for the circuits of FIGS. 3 and 6, the circuit of FIG. 7 will be described primarily in the manner in which it differs significantly from those prior circuits.

A bridge rectifier 720 converts the voltage input $V_{IN}$ into a DC form appropriate for use by the SMPS circuit 700. Whereas the prior circuits used one or more depletion-mode MOSFETs as a normally-on switch device, the circuit of FIG. 7 uses an enhancement-mode MOSFET (Q1) that is effectively configured to operate in a normally-on manner. Particularly, whenever a voltage $V_{IN}$ is applied, a positive voltage is seen at the node labeled $V_{OUT}$. The resistors R1 and R5 pull the gate of MOSFET Q1 to a voltage level higher than the threshold level for the device, thereby enabling it. Thus, MOSFET Q1, even though it is an enhancement-mode device, effectively operates as a normally-on switch device.

An SMPS controller 710 is powered, at its input $V_{CC}$, from a tap connection point via diode D2 and capacitor C7. An enhancement-mode MOSFET is integrated into the SMPS controller, and the tap connection point is the node connecting the source of MOSFET Q1 and the DRAIN terminal of the MOSFET within the SMPS controller 710. In a manner similar to the previously-described circuits, capacitor C7 is charged when MOSFET Q1 is enabled and the MOSFET within the SMPS controller 710 is disabled. The capacitor C7 stores this energy and powers the SMPS controller 710 during other periods of time.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method in a switched-mode power supply (SMPS) for supplying power to a controller of the SMPS, the SMPS including a normally-on switch device connected in series with a normally-off switch device at a tap connection point, the switch devices configured to provide current to a load of the SMPS, the method comprising:
   supplying current to a load of the SMPS by enabling the normally-on switch device and the normally-off switch device so that both devices are conducting;
   disabling the normally-off switch device and, while the normally-off switch device is disabled:
      detecting the voltage level at the tap connection point;
      enabling the normally-on switch device responsive to detecting that the voltage at the tap connection point is below a first level; and
      disabling the normally-on switch device responsive to detecting that the voltage at the tap connection point is above a second level that is higher than the first level,
wherein the normally-on switch device is enabled unless an appropriate signal is provided to a control terminal of the normally-on switch device, and the normally-off switch device is disabled unless an appropriate signal is provided to a control terminal of the normally-off switch device.

2. The method of claim 1, wherein the controller of the SMPS drives a control terminal of the normally-off switch device to enable or disable the normally-off switch device.

3. The method of claim 1, wherein the normally-off switch device comprises one or more of an enhancement-mode metal-oxide semiconductor field-effect transistor (MOSFET), a junction field-effect transistor (JFET), and a bipolar junction transistor (BJT).

4. The method of claim 1, wherein the normally-on switch device comprises one or both of a depletion-mode metal-oxide semiconductor field-effect transistor (MOSFET) and a junction field-effect transistor (JFET).

5. The method of claim 4, wherein the depletion-mode MOSFET is one of a plurality of depletion-mode MOSFETs cascoded in series.

6. The method of claim 1, wherein the SMPS includes a flyback converter and the output of the normally-on switch device is connected to a primary winding of the flyback converter.

7. The method of claim 1, wherein the SMPS is a buck converter.

8. The method of claim 1, further comprising limiting the tap connection voltage to be below a third level that is higher than the second level.

9. A method in a switched-mode power supply (SMPS) for supplying power to a controller of the SMPS, the SMPS including a normally-on switch device connected in series with a normally-off switch device at a tap connection point, the switch devices configured to provide current to a load of the SMPS, the method comprising:
   maintaining the normally-on switch device in its default state of being enabled such that it conducts, and maintaining the normally-off switch device in its default state of being disabled such that it does not conduct, thereby supplying current to the SMPS controller during a startup phase, wherein the SMPS controller does not control the normally-on switch device or the normally-off switch device during the startup phase;
   detecting the voltage level at the tap connection point; and
   responsive to detecting that the voltage level at the tap connection point has reached a third level, preventing the voltage at the tap connection point from increasing further by enabling a clamping device, or by disabling the normally-on switch device, or both,
wherein the normally-on switch device is enabled unless an appropriate signal is provided to a control terminal of the normally-on switch device, and the normally-off switch device is disabled unless an appropriate signal is provided to a control terminal of the normally-off switch device.

10. A switched-mode power supply (SMPS) circuit comprising:
   a normally-on switch device;
   a normally-off switch device connected in series to the normally-on switch device at a tap connection point;
   an SMPS controller that is supplied power from the tap connection point; and
   a bang-bang controller configured to:
      detect a voltage at the tap connection point;
      enable the normally-on switch device responsive to detecting that the voltage at the tap connection point is below a first level; and
      disable the normally-on switch device responsive to detecting that the voltage at the tap connection point is above a second level that is higher than the first level,
wherein the normally-on switch device is enabled unless an appropriate signal is provided to a control terminal of the normally-on switch device, and the normally-off switch device is disabled unless an appropriate signal is provided to a control terminal of the normally-off switch device.

11. The SMPS circuit of claim 10, wherein power is supplied to the SMPS controller from the tap connection point during a time period when the normally-off switch is disabled and when the normally-on switch is enabled.

12. The SMPS circuit of claim 10, further comprising:
   a diode connected between the tap connection point and a power supply input of the SMPS controller wherein the diode allows current to flow from the tap connection point to the power supply input; and
   a capacitor connected to the power supply input of the SMPS controller such that energy may be stored by the capacitor when current is flowing from the tap connection point to the power supply input and the capacitor, and such that the capacitor supplies energy to the power supply input when no current is flowing from the tap connection point.

13. The SMPS circuit of claim 10, wherein power is supplied to the SMPS controller from the tap connection point during a startup period of the SMPS in which the SMPS controller is not providing a control signal to drive a control terminal of the normally-off switch device, or a control terminal of the normally-on switch device, or both.

14. The SMPS circuit of claim 10, wherein power is supplied to the SMPS controller from the tap connection point during steady-state operation of the SMPS in which the SMPS controller is providing a control signal to drive a control terminal of the normally-off switch device or a control terminal of the normally-on switch device, or both.

15. The SMPS circuit of claim 10, wherein the bang-bang controller is a separate circuit from the SMPS controller.

16. The SMPS circuit of claim 10, wherein the SMPS controller drives a control terminal of the normally-off switch device.

17. The SMPS circuit of claim 10, wherein the normally-off switch device comprises one or more of an enhancement-mode metal-oxide semiconductor field-effect transistor (MOSFET), a junction field-effect transistor (JFET), and a bipolar junction transistor (BJT).

18. The SMPS circuit of claim 10, wherein the normally-on switch device comprises one or both of a depletion-mode metal-oxide semiconductor field-effect transistor (MOSFET) and a junction field-effect transistor (JFET).

19. The SMPS circuit of claim 18, wherein the depletion-mode MOSFET is one of a plurality of depletion-mode MOSFETs cascoded in series.

20. The SMPS circuit of claim 10, wherein the normally-on switch device comprises an enhancement-mode metal-oxide semiconductor field-effect transistor (MOSFET) configured within additional circuit components to function as a normally-on switch device.

21. The SMPS circuit of claim 10, further comprising:
   a flyback converter wherein a primary winding of the flyback converter is connected to an output of the normally-on switch device.

22. The SMPS circuit of claim 10, wherein the SMPS circuit is a buck converter.

23. The SMPS circuit of claim 10, further comprising a clamping device configured to limit the voltage at the tap connection point to a third level that is higher than the second level.

* * * * *